United States Patent [19]

McMillan

[11] 3,963,378
[45] June 15, 1976

[54] PART THROTTLE CONTROL — PUMP OVERRIDE

[75] Inventor: William D. McMillan, Joliet, Ill.

[73] Assignee: Caterpillar Tractor Co., Peoria, Ill.

[22] Filed: June 4, 1975

[21] Appl. No.: 583,366

[52] U.S. Cl. .................................. 417/216; 60/428; 60/447; 60/449
[51] Int. Cl.² .................... F04B 49/00; F16D 31/02
[58] Field of Search ........... 417/216, 218, 219, 222; 60/447, 449, 428

[56] References Cited
UNITED STATES PATENTS

| | | | |
|---|---|---|---|
| 3,672,166 | 6/1972 | Isaac ................................... | 60/447 |
| 3,732,036 | 5/1973 | Busbey et al. ....................... | 417/216 |
| 3,841,795 | 10/1974 | Ferre et al. ......................... | 417/216 |
| 3,884,039 | 5/1975 | Pourian ............................... | 60/447 |

Primary Examiner—William L. Freeh
Assistant Examiner—G. P. La Pointe
Attorney, Agent, or Firm—Phillips, Moore, Weissenberger, Lempio & Strabala

[57] ABSTRACT

A hydraulic power system having a plurality of variable displacement pumps for supplying pressurized fluid for manipulation of an implement includes control means operative to automatically adjust pump displacement to the output horsepower of a prime mover driving the pumps of a system. The control system includes underspeed valve means responsive to a deviation in the speed of the prime mover from a predetermined normal speed to transmit a fluid pressure signal to a servo control means for adjusting the displacement of the pumps. The underspeed valve means includes adjusting means for adjusting the underspeed valve to respond to a deviation from other engine speeds different from the normal operating speed.

6 Claims, 1 Drawing Figure

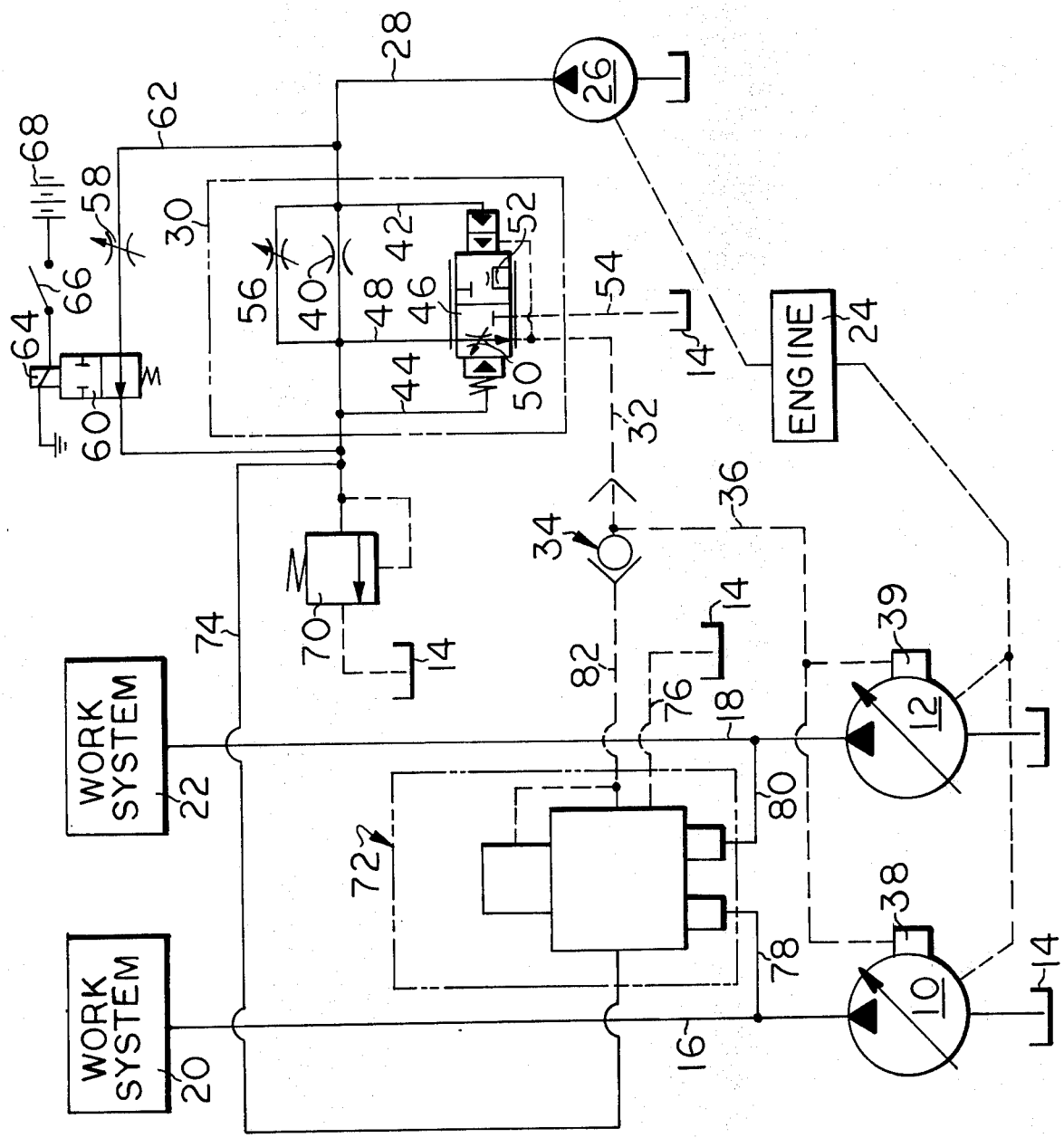

PART THROTTLE CONTROL — PUMP OVERRIDE

BACKGROUND OF THE INVENTION

The present invention is directed to hydraulic control systems, and pertains more particularly to a hydraulic control system having a plurality of variable displacement pumps and means for automatically adjusting the displacement of the pumps to engine output.

Many hydraulically actuated implements, such as a hydraulic excavator, normally employ a plurality of variable displacement pumps for supplying the high-pressure hydraulic fluid necessary to power the many motors employed in manipulating the excavator bucket and linkage. Reference is made to U.S. Pat. No. 3,841,795 issued Oct. 15, 1974 to Ferre et al, assigned to the assignee hereof, for background material pertinent to the subject invention. The above patent was developed to overcome certain problems of the prior art and functions very satisfactorily so long as a single predetermined engine speed or engine normal operating speed is selected and maintained.

Earth-moving machines, such as the hydraulic excavator, are normally designed to have a predetermined normal operating speed of the engine during normal operation of the machine. With such machines the engine throttle is normally set at a predetermined position when the machine is in normal operation.

Frequently, it is desirable to operate the vehicle at a lower or higher engine speed. This becomes a problem when the hydraulic system is equipped with a control system such as that of U.S. Pat. No. 3,841,795. With such a system, as soon as the engine speed is reduced, the differential pressure across the underspeed valve orifices would signal the pumps of the system to stroke as they would think that the engine was running slower due to lugging. Thus, one would be unable with that system to operate the vehicle with the engine at a lower speed and at the same time obtain full pump flow from the pumps.

SUMMARY OF OBJECTS OF THE INVENTION

It is the primary object of the present invention to provide horsepower controlling means for a hydraulic system that is operative to overcome the above problems of the prior art.

Another object of the present invention is to provide horsepower controlling means for hydraulic systems having a plurality of variable displacement pumps with adjustable speed-responsive means to adjust the speed-responsive means of this system to a plurality of predetermined operating speeds.

In accordance with the primary aspect of the present invention, a hydraulic control system having a plurality of variable displacement pumps, and an underspeed valve means responsive to the output of the engine is provided with variable adjustable means for the underspeed valve means so that the system can be adjusted to a plurality of predetermined operating positions or speeds of the engine.

BRIEF DESCRIPTION OF THE DRAWING

The above and other objects and advantages of the present system will become apparent from the following description when read in conjunction with the drawing wherein:

The drawing is a schematic layout of a hydraulic control system embodying the present invention.

DETAILED DESCRIPTION OF THE PREFERRED EMBODIMENT

Referring to the drawing, a hydraulic control system embodying a system of the present invention is schematically illustrated in operative combination with a multiple pump implement control circuit, a portion of which is illustrated. The implement control circuit is of the type that would be utilized in a machine such as a hydraulic excavator or the like wherein a plurality of hydraulic motors are used in combination individually and/or simultaneously for the manipulation of an implement.

The system comprises a plurality of variable displacement pumps 10 and 12 which draw fluid from a reservoir 14 and supplied by way of output or supply lines or conduits 16 and 18 respectively to work systems 20 and 22. Work systems 20 and 22 may be any suitable arrangement of valves and motors for providing power for operation of implements or the like.

The pumps 10 and 12 are variable displacement pumps and are driven by common prime mover means such as an internal combustion engine 24 which is operatively connected to drive a fixed displacement pump 26 which supplies pilot fluid for performing certain control functions within the system. Among these functions are the control of the variable speed pumps 10 and 12. Pilot fluid from the pump 26 is supplied by way of a pilot supply line 28 to an underspeed valve assembly 30 which is operative under certain conditions to transmit a signal by way of the pilot control line 32, a shuttle valve 34, a pilot control line 36 to servo-control means of actuators 38 and 39 of the pumps 10 and 12 respectively. The servo actuators are responsive to certain pressure signals to reduce the displacement of the respective pumps 10 and 12.

The underspeed valve assembly 30 includes a primary orifice which receives flow by way of conduit 28, causing a differential pressure, which pressure is communicated by way of conduits 42 and 44 to a pressure-controlled pilot valve 46. This signal pressure communicated by way of the conduits 42 and 44 acts on pressure-controlled pilot valve 46 to shift it to various positions including the position shown wherein pilot fluid is communicated by way of a passage 48 across the valve to the pilot control line 32 which is then communicated to the pump's servo actuators 38 and 39 for reducing the displacement of the pumps. The pressure-controlled pilot valve 46 includes a variably restricted passage 50 for communicating between pilot passage 48 and pilot control line 32 when the valve 46 is in a certain position. A restricted passage 52 provides communication between the pilot control line 32 and a return passage 54 to tank 14 for venting passage 32 and pilot control line 36.

The underspeed valve 30 also includes a variable orifice 56 which is operative to adjust the signal pressure for properly positioning the pressure responsive pilot valve 46 for a predetermined normal operating speed of the engine 24. For example, when the vehicle engine is running at a predetermined normal operating speed, the pilot pump is producing a predetermined amount of flow to the control system. The pressure differential across the orifice 40 is an amount necessary to maintain the pressure responsive pilot valve 46 in its unloading position, that is, with pilot control line 32 communicating with return passage 54, thus resulting in relieving pressure signal against the servo control actuators 38 and 39. As the engine speed drops, the pilot pumps begin to slow down and produce less load than normal through pilot supply line 28 and across orifice 40, the pressure differential will cause shifting of the pressure-responsive pilot valve 46 to the position as shown and will communicate a modified pilot pressure to the pump servo controls 38 and 39 by way of the conduits 48, 32, 34, 36 for the stroking of the pumps 10 and 12 to some angle which will balance the total pump torque load with the available engine torque.

Thus, the underspeed valve assembly 30 is preadjusted to a predetermined maximum or normal operating speed of the vehicle engine 24 for normal operation of the system. As soon as a load acts on the system and loads the engine, causing it to slow down, the underspeed valve assembly immediately signals the pumps 10 and 12 by way of servo actuators 38 and 39 to immediately reduce displacement to limit torque demand of the pump in relation to available engine torque. However, should the operator desire to run the vehicle engine at something less than the maximum predetermined normal operating speed, the underspeed valve assembly 30 would automatically cut back the displacement of pumps 10 and 12 and prevent full flow of fluid therefrom for operation of the work system.

The present invention solves the above problem by providing adjustable means in the form of a variable orifice 58 and suitable valve means 60 in parallel with the underspeed valve assembly 30 in a line 62. Thus, with this arrangement, the flow across the underspeed valve assembly 30 can be modified without altering the speed of the fixed displacement pump 26 to thereby adjust the underspeed valve for response to a speed of the engine which is at least one other speed different from the normal operating speed.

During normal operation of the vehicle, the valve 60 is in its fluid communicating position, thus the pressure differential across orifices 40, 56 and 58 establishes a normal signal at the predetermined normal operating speed of the engine 24. However, should the operator wish to run the engine at a speed somewhat less than maximum normal operating speed, the valve 60 may be shifted to the blocking position to maintain a normal signal in the system or underspeed valve assembly 30 at an engine speed somewhat less than normal predetermined operating speed. Thus, as a result of this variable means, the variable orifices are effectively resized to provide the proper amount of pressure during maximum normal speed of the engine and maximum flow of the pilot pump 26. As the engine begins to lug, the pilot flow differential pressure signals the variable displacement pumps 10 and 12 to stroke to somewhat less displacement than previously described. However, if the operator chooses to run the vehicle at a somewhat less than maximum normal predetermined speed, he would signal the two-way normally open solenoid value 60 to block the flow through the variable orifice 58 and thus establish the right amount of flow through the underspeed valve orifices 40 and 56 so that the pumps would respond as though the engine were still running at full speed. This modification offers to the operator the ability to use his vehicle with the engine running at somewhat less than maximum normal speed and still accomplish his job with full pump flow at that speed.

The valve 60 may be actuated in any suitable manner such as, for example, solenoid-operated, having, for example, a solenoid, a circuit breaker 66 and a source of current 68. The valve may, of course, be operated by a hydraulic system or by manual means.

A suitable pressure relief valve 70 is provided in the pilot circuit for preventing overpressurization of the system.

The underspeed valve control arrangement of the present invention may be used in combination with a summing valve arrangement indicated generally at 72. The basic combination of an underspeed valve and a summing valve arrangement is disclosed in U.S. Pat. No. 3,841,795 issued Oct. 15, 1974. The specific details of a suitable summing valve arrangement is shown, for example, in U.S. Pat. No. 3,732,036 issued May 8, 1973. The summing valve 72 is supplied with pilot fluid by way of conduit 74. The summing valve in general includes a spool which is normally biased to an open position for normal operation and includes means responsive by way of conduits 78 and 80 to shift the valve spool in response to load pressure in fluid supply conduits 16 and 18. This load pressure is operative to shift the spool to a position to direct pilot fluid by way of conduit 82 to shuttle valve 34 where the higher pressure from the underspeed valve or the summing valve is communicated by way of pilot control line 36 to the servo actuator means 38 and 39 for stroking the pumps 10 and 12 to a reduced displacement. Thus, when pressure in conduits 16 and 18 rises above a predetermined amount, this pressure is directed to shift the summing valve to a position to signal the pumps 10 and 12 to reduce displacement thereof. This has an effect of reducing the load on the engine and maintaining a suitable power output of the system.

Thus, the system is responsive to both engine speed as well as pressure imposed on the hydraulic system to effect an adjustment in the output of the hydraulic pumps supplying fluid to the system.

Thus, from the above description it is seen that there is provided a control system for hydraulic system having an underspeed valve that is adjustable to a predetermined engine speed and is responsive thereafter to a deviation from that predetermined speed to alter displacement of variable displacement pumps within the system. The system may also include in the combination a summing valve arrangement to provide additional control of the system.

I claim:

1. A hydraulic system including the combination of a horsepower-controlling system for controlling the horsepower output of a plurality of variable displacement pumps driven by a single prime mover, said system comprising:
    a source of pilot pressure including a fixed displacement pump driven by said prime mover for controlling displacement of said pumps in relation to the speed output of said prime mover;
    underspeed control valve means responsive to a deviation from a predetermined normal operating speed of said prime mover for normally controlling the communication of said pilot control pressure with said pump displacement means to thereby vary the displacement of said pumps in proportion to load thereon; and,
    adjustable means for adjusting the response of said underspeed valve to respond to a deviation from at least another speed different from said normal operating speed.

2. The hydraulic system of claim 1 wherein:

said adjustable means comprises an orifice connected in parallel with said underspeed control valve means, and means for adjusting the flow of fluid through said underspeed control valve means.

3. The hydraulic system of claim 2 wherein:
said adjustable means includes a valve for controlling the flow of fluid through said orifice.

4. The hydraulic system of claim 3 wherein said valve is biased to a first predetermined position for permitting free flow through said orifice and is shiftable to a second position for blocking the flow of fluid through said orifice.

5. The hydraulic system of claim 1 including summing valve means comprising a valve having a predetermined bias in the direction to cut off said communication, and a plurality of pressure-responsive means responsive to the sum of the pressure output of said variable displacement pumps to bias said valve in a direction to provide open communication between said source of control pressure and said pump displacement controlling means.

6. The hydraulic system of claim 2 including summing valve means comprising a valve having a predetermined bias in the direction to cut off said communication, and a plurality of pressure-responsive means responsive to the sum of the pressure output of said variable displacement pumps to bias said valve in a direction to provide open communication between said source of control pressure and said pump displacement controlling means.

* * * * *